(12) United States Patent
Tadayoshi

(10) Patent No.: US 7,773,863 B2
(45) Date of Patent: Aug. 10, 2010

(54) DATA DECODING DEVICE, DATA DECODING METHOD, SEMICONDUCTOR INTEGRATED CIRCUIT AND DATA DECODING SYSTEM, USING TAG ADDED TO DATA PACK

(75) Inventor: Kono Tadayoshi, Kawasaki (JP)

(73) Assignee: Fujitsu Semiconductor Limited, Yokohama (JP)

( * ) Notice: Subject to any disclaimer, the term of this patent is extended or adjusted under 35 U.S.C. 154(b) by 1416 days.

(21) Appl. No.: 11/063,751

(22) Filed: Feb. 24, 2005

(65) Prior Publication Data

US 2006/0056812 A1    Mar. 16, 2006

(30) Foreign Application Priority Data

Sep. 16, 2004  (JP) .............................. 2004-270071

(51) Int. Cl.
  *H04N 5/917*    (2006.01)
(52) U.S. Cl. ...................................... 386/112; 386/124

(58) Field of Classification Search ................. 386/111, 386/98, 104–106, 112, 109, 124–126, 68
See application file for complete search history.

(56) References Cited

U.S. PATENT DOCUMENTS

2003/0226093 A1*  12/2003  Kono et al. .................. 714/776

FOREIGN PATENT DOCUMENTS

JP            11-162119        6/1999

* cited by examiner

*Primary Examiner*—David E Harvey
(74) *Attorney, Agent, or Firm*—Fujitsu Patent Center

(57) ABSTRACT

A data decoding device for decoding a compressed and coded data includes: an inverse multiplexing part configured to separate compressed and coded data into a plurality of unit data, then separated, from the unit data, more than one type of a data pack, and adding a tag such that the data pack can be identified as separating from the same unit data; and a decoding part configured to monitor the tag, while carrying out decoding of the data pack separated from the same unit data for each unit of the unit data.

14 Claims, 15 Drawing Sheets

FIG.15

| EVENT | VALUE OF TAG | VALUE OF TAG REGISTER |
|---|---|---|
| INITIAL VALUE | 1 | 0 |
| DECODING OCCASION | +1 | WRITE VALUE OF TAG |
| BUFFER FLASH OCCASION | | ALL 1'S (ffffffff) |

US 7,773,863 B2

DATA DECODING DEVICE, DATA DECODING METHOD, SEMICONDUCTOR INTEGRATED CIRCUIT AND DATA DECODING SYSTEM, USING TAG ADDED TO DATA PACK

CROSS-REFERENCE TO RELATED APPLICATIONS

This application is based upon and claims priority of Japanese Patent Application No. 2004-270071, filed in Sep. 16, 2004, the contents being incorporated herein by reference.

BACKGROUND OF THE INVENTION

1. Field of the Invention

The present invention relates to a data decoding device, a data decoding method, a semiconductor integrated circuit and a data decoding system for decoding data compressed and coded according to a DVD standard.

2. Description of the Related Art

Recently, a DVD attracts an attention as a storage medium. In such a DVD, a bit stream compressed and coded according to a video standard is recorded. The video stream compressed and coded according to the video standard is called a video object (VOB).

FIG. 1 shows a data structure of one example of the VOB. VOB 1 can be separated into decoding units called cells 2. Further, the cell 2 can be separated into minimum units called video object units (VOBU) 3. The VOBU 3 always starts from a single navy pack (Nv_pck), and can include, subsequent to the navy pack, video packs (V_pct), audio pack (A_pack) and sub-picture packs (Sp_pck), as shown.

The navy pack is a pack for controlling, including reproduction information (PCI) and address information (DSI) on a disk for the video packs, audio packs and sub-picture packs. Each VOBU 3 absolutely includes one navy pack. The video packs, audio packs and sub-picture packs should not be absolutely included in each VOBU 3.

The term 'pack' means a collection of data having a data length of 2048 bytes, and includes a pack header and packets. Japanese Laid-open Patent Application No. 11-162119 discloses a method for reproducing VOB according to a DVD video standard.

FIG. 2 shows a configuration diagram of one example of a data decoding device for decoding VOB. Ordinarily, the data decoding device decodes VOB for each VOBU unit. The data decoding device shown in FIG. 2 generally includes a hardware 100 and a software 200. First, description is made for the hardware 100.

The VOB read out from a DVD disk 10 is stored in a track buffer (Trk_buff) 101 of the hardware 100. At this time, the VOB is managed for each VOBU unit with a separation therebetween. Subsequent to the track buffer 101, a demux (DEMUX) 102 for separating the VOBU into respective packs of the above-mentioned four types, i.e., the navy pack, video packs, audio packs and sub-picture packs is connected.

Subsequent to the demux 102, a video buffer (Video_buff) 103, an audio buffer (Audio_buff) 104, a sub-picture buffer (Sp_buff) 105 and a navy buffer (Nv_buff) 106 for storing the respective packs are connected.

Bit streams read out from the video buffer 103, the audio buffer 104 and the sub-picture buffer 105 are decompressed by a video decoder (Video_Decoder) 107, an audio decoder (Audio Decoder) 108 and a sub-picture decoder (Sp_Decoder) 109, respectively, thus become a form of video, audio and subtitle, and are output from the hardware 100.

Next, description is made for the software 200. A current manger 202 reads out the navy pack from the navy buffer 106, and stores it in a navy spool (Nv_spool) 203. A reproduction engine 204 reads the navy pack from the navy spool 203, and carries out control for actual data reproduction. A basic configuration of the software 200 includes the current managing part 202, the navy spool 203 and the reproduction engine 204.

The reproduction engine 204 extracts the PCI from the navy pack thus read out from the navy spool 203, and transmits it to a STC alarm registration managing part 206. The reproduction engine 204 transmits highlight information (HLI) to the STC alarm registration managing part 206 via a highlight information control part (HLI control part) 205.

VOBU_S_PTM included in the PCI is transmitted to the STC alarm registration managing part 206 from the current managing part 202. VOBU_E_PTM included in the PCI is transmitted to the STC alarm registration managing part 206 from the reproduction engine 204. HL_S_PTM, HL_E_PTM and BTN_SL_E_PTM included in the HLI are transmitted to the STC alarm registration managing part 206 from the reproduction engine 204 via the HLI control part 205.

The STC alarm registration managing part 206 registers the received data, i.e., time information included in the PCI, that is, VOBU_S_PTM, VOBU_E_PTM, HL_S_PTM, HL_E_PTM and BTN_SL_PTM in a system clock (STC) 201 in the ascending order. The STC 201 starts time measurement simultaneously upon a start of data reproduction, and, when a registered time has been reached, the STC 201 notifies the reproduction engine 204 and the HLI control part 205 of an alarm.

FIGS. 3 and 4 are a flow chart showing one example of operation of the data decoding device. Here, description is made paying attention to the respective buffers and the navy pack. In Step S1, it is determined whether or not the track buffer 101 has a free storage space.

When a free storage space exists (Yes in Step S1), a VBO request is issued in Step S2, and, in Step S3, VOB is transferred from the DVD disk 10 to the track buffer 101. When there is no free storage space (No in Step S1), Step S4 is executed, and thus, issuance of the VOB request is stopped.

Then in Step S5, it is determined whether or not any one of the video buffer 103, the audio buffer 104, the sub-picture buffer 105 and the navy buffer 106 has no more free storage space.

When all of the above-mentioned four buffers still have free storage spaces (No in Step S6), Step S5 is executed in which VOBU is input to the demux 102 from the track buffer 101. When any one of the four buffers has no more free storage space (Yes in Step S6), Step S7 is carried out in which input of VOBU to the demux 102 is stopped. That is, when any one of the four buffers has no more free storage space, input of VOBU is stopped also with respect to other buffers still having free storage spaces.

Then, Step S8 is repeated until the navy packs are stored in the navy buffer 106 (No in Step S8). When the navy packs are stored in the navy buffer 106 (Yes in Step S8), the current managing part 202 is notified of a navy pack writing finish notification. In Step S9, the current managing part 202 obtains the navy pack from the navy buffer 106 via a host interface (Host I/F) part 110.

Then, in Step S10, the current managing part 202 stores the navy pack thus obtained from the navy buffer 106, in the navy spool 203. As long as any free storage space exists in the navy spool 203 (No in Step S11), the current managing part 202 repeats the processing of Steps S8 through S11, and stores the navy pack obtained from the navy buffer 106, in the navy spool 203 repetitively.

When the navy spool 203 has no more free storage space (Yes in Step S11), the current managing part 202 executes Step S12, and thus, registers VOBU_S_PTM(0) in the STC alarm registration managing part 206 in prior to other parameters. Then in Step S13, the reproduction engine 204 obtains the first navy pack Nv_pck(0) from the navy spool 203.

In Step S14, the reproduction engine 204 extracts HLI from the navy pack Nv_pck(0), and transmits it to the HLI control part 205. In Step S15, the reproduction engine 204 registers VOBU_E_PTM(0) in the STC alarm registration managing part 206.

In Step S16, the HLI control part 205 registers HL_S_PTM (0), HL_E_PTM(0) and BTN_SL_E_PTM(0) in the STC alarm registration managing part 206.

In the processing so far, reproduction preparation for the first navy pack Nv_pck(0) is completed. The processing of Steps S12 through S16 is called 'reproduction standby'. In Step S17, processing of Step S17 is repeated until it is determined that reproduction is started (Yes in Step S17). When it is determined that reproduction is started (Yes in Step S17), decoding of the bit streams stored in the video buffer 103, the audio buffer 104 and the sub-picture buffer 105 is started. In Step S19, the STC 201 starts counting.

In Step S20, the current managing part 202 registers VOBU_S_PTM(1) in the STC alarm registration managing part 206. In Step S21, processing of Step S21 is repeated until a reproduction start time VOBU_S_PTM(1) for the second navy pack Nv_pck(1) is reached (No in Step S21).

After that, a time has elapsed and thus, the reproduction start time VOBU_S_PTM(1) for the second navy pack Nv_pck(1) has been reached, the STC 201 executes Step S22, and thus, it notifies the reproduction engine 204 and the HLI control part 205 of an alarm. In Step S23, the reproduction engine 204 then obtains the second navy pack Nv_pck(1) from the navy spool 203.

In Step S24, the reproduction engine 204 extracts HLI from the second navy pack Nv_pck(1) and transmits it to the HLI control part 205. In Step S25, the reproduction engine 204 registers VOBU_E_PTM(1) in the STC alarm registering managing part 206.

In Step S26, the HLI control part 205 registers HL_S_PTM (1), HL_E_PTM(1) and BTN_SL_E_PTM(1) in the STC alarm registration managing part 206. In Step S27, it is determined whether or not reproduction is still continued. When it is determined that reproduction is continued (Yes in Step S27), the processing of Steps S20 through S26 is carried out for the subsequent navy pack. That is, as a result of the processing of Steps S20 through S27 is repeated, data reproduction from the DVD disk is carried out.

On the other hand, when it is determined that reproduction is no more continued (No in Step S27), decoding of the bit streams stored in the video buffer 103, audio buffer 104 and the sub-picture buffer 105 is stopped. Then in Step S29, the STC 201 stops counting, and holds the current count value.

SUMMARY OF THE INVENTION

In the above-described data decoding device, a problem occurs when VOBU such as that shown in FIG. 5 is decoded. FIG. 5 shows a data structure of one example of VOBU. VOBU shown includes audio in two types, i.e., a voice of English and a voice of Japanese. In FIG. 5, the audio pack corresponding to the English voice is expressed as A_pck(E) while the audio pack corresponding to the Japanese voice is expressed as A_pck(J).

Normally, in VOBU, the audio packs corresponding to the English voice and the audio packs corresponding to the Japanese voice are multiplexed evenly. However, in VOBU shown in FIG. 5, the multiplexing has a deviation between the audio packs corresponding to the English voice and the audio packs corresponding to the Japanese voice as shown.

For example, in FIG. 5, the audio packs corresponding to the English voice are multiplexed in VOBU(n) through VOBU(n+5), while the audio packs corresponding to the Japanese voice are multiplexed in VOBU(n+6). The video packs corresponding to a video are multiplexed in VOBU(n) and VOBU(n+1). On the other hand, no sub-picture packs corresponding to subtitles are not multiplexed there.

With reference to FIGS. 6 and 7, description is made for a state transition of the four buffers, i.e., the video buffer 103, the audio buffer 104, the sub-picture buffer 105, the navy buffer 106, and the navy spool 203 for a case where data reproduction is carried out from VOBU shown in FIG. 5, and switching is made in a voice from English to Japanese in the above-described data decoding device. FIGS. 6 and 7 show state transmission diagrams for these four buffers and the navy spool.

A state of FIG. 6, (A) is an initial state before a start of data reproduction. In this state, the four buffers and the navy spool 203 are free as shown. The track buffer not shown in FIGS. 6 and 7 is also free.

Since the track buffer 101 is free in this state, a VOB request is issued, and transfer of VOB from the DVD disk 10 to the track buffer 101 is started. After that, VOB thus stored in the track buffer 101 is input to the demux for each VOB unit, is separated into the respective four types of packs described above by the demux 102, and is stored in the respective relevant buffers.

In a state of FIG. 6, (B), the navy buffer 106 has no more free storage space, input of VOBU to the demux 102 is stopped, and issuance of the VOB request is stopped. After that, the above-mentioned reproduction standby processing is carried out.

In a state of FIG. 6, (C), reproduction processing is started, the reproduction engine 204 reads out the navy packs from the navy spool 203 and consumes them. Further, the current managing part 202 reads out the navy packs from the navy buffer 106, and consumes them. At this time, the audio packs A_pck(E) corresponding to the English voice are stored in the audio buffer 104, and as a result, an English voice is output. In FIGS. 6 and 7, the thus-consumed navy packs are crossed off by lines (-).

Then, it is assumed that a user gives an instruction to switch the voice language. Upon issuance of this voice switching instruction, the data decoding device flashes (deletes) the audio packs A_pck(E) currently stored in the audio buffer 104. A state of FIG. 6, (D) is a state in which, the voice switching instruction is issued, and thus the audio packs are flashed from the audio buffer 104. The video packs stored in the video buffer 103 are consumed.

After that, waiting is carried out until the audio pack A_pck (J) is stored in the audio buffer 140, and then, data reproduction is started again after the audio pack A_pck(J) is stored in the audio buffer 104. However, as shown in FIG. 7, (E), storage of the audio pack A_pck(J) for the audio buffer 104 is carried out after all the navy packs stored in the navy buffer 106 are read out and flashed (deleted).

To read out all the navy packs from the navy buffer 106 means to consume all the navy packs stored in the navy spool 203. The is, storage of the audio pack A_pck(J) for the audio buffer 104 is started, as shown in FIG. 7, (F), after all the navy packs stored in the navy buffer 106 and the navy spool 203 are consumed. A state of FIG. 7, (G) is a state in which storage of the audio packs A_pck(J) in the audio buffer 104 has been completed.

A fact that no audio pack A_pck(J) is stored in the audio buffer 104 means that no Japanese voice is output. Accordingly, in this data decoding device in the related art, a voice interruption may continue for a so long time upon voice switching, that it may be recognized by a user. A maximum time Tmax for which the voice interruption may continue upon voice switching may be expressed by the following formula (1):

$$\text{Tmax} = (\text{maximum reproduction time of } \textit{VOBU}) \times (\text{capacity of } \textit{Nv\_buff} + \text{capacity of } \textit{Nv\_spool}) \quad (1)$$

For example, for a case where the maximum reproduction time of VOBU is 0.5 seconds, and a capacity of each of the navy buffer 106 and the navy spool 203 is 16 packs, the maximum time Tmax of the voice interruption upon voice switching is calculated as being 16 seconds.

A first reason why the voice interruption upon voice switching is thus long is that the navy buffer 106 is made of a memory for which overwriting is not allowed. The navy buffer 106 is thus made of the overwriting inhibited memory since the navy packs for control should not be erased improperly. In fact, if the navy packs are erased or reading out thereof is failed in, PCI, DSI or such of the video packs, audio packs and sub-picture packs separated from the same VOBU are lost accordingly.

A second reason why the voice interruption upon voice switching is thus long is that, as shown in FIG. 7, (E), even though all the video buffer 103, the audio buffer 104 and the sub-picture buffer 105 become free, the navy packs corresponding thereto are still read out from the navy buffer 106 and are still consumed.

That is, although the video buffer 103, the audio buffer 104 and the sub-picture buffer 105 have no more video pack, no more audio pack and no more sub-picture pack, respectively, to be controlled, only the navy packs separated from the same VOBU are still consumed according to the registered time, and thus, the voice interruption upon voice switching becomes longer.

In this case, the navy packs stored in the navy buffer 106 and the navy spool 203 have become no more necessary, and thus, may be immediately flashed. That is, the second reason why the voice interruption upon voice switching becomes longer is caused by the first reason why the voice interruption upon voice switching becomes longer, which first reason is originally caused from the view point that the navy packs should be protected as mentioned above.

In other words, the reason why the voice interruption upon voice switching becomes longer is that, since dependency relationship between the navy packs and the other video packs, audio packs and sub-picture packs is not maintained, the navy packs cannot be easily erased.

The present invention has been devised in consideration of the above-mentioned point, and an object of the present invention is to provide a data decoding device by which it is possible to shorten the voice interruption or subtitle interruption upon voice switching or subtitle switching.

According to the present invention, a data decoding device for decoding a compressed and coded data, includes: an inverse multiplexing part configured to separate compressed and coded data into a plurality of units of unit data, then further separate, from the unit data, more than one type of a data pack, and adding a tag such that the data pack can be identified as originating from the same unit data; and a decoding part configured to monitor the tag, while carrying out decoding of the data pack separated from the same unit data, for each unit of the unit data. The present invention may be embodied in a form of a data decoding method, a semiconductor integrated circuit, or a data decoding system for carrying out the above-mentioned data decoding device.

According to the present invention, the tab is added so that the data packs separated from the same data unit can be identified. As a result, it is possible to easily identify the data packs of one or more types separated from the same unit data, and, it is possible to carry out decoding of the data packs for each unit of the unit data while monitoring the tags.

As a result, upon voice switching or subtitle switching, it is possible to easily identify the data packs separated from the same unit data, and thus, it is possible to rapidly erase the data packs of one or more types which originate from the same unit data and become no more necessary. Thereby, it is possible to shorten the voice interruption or subtitle interruption upon voice switching or subtitle switching.

Thus, according to the present invention, it is possible to provide a data decoding device by which it is possible to shorten the voice interruption or subtitle interruption even upon voice switching or subtitle switching.

Other objects and further features of the present invention will become more apparent from the following detailed description when read in conjunction with the accompanying drawings:

BRIEF DESCRIPTION OF THE DRAWINGS

FIG. 15 shows a value of a tag added to each pack of four types of packs, and a value of a tag stored in a register and a pointer according to the embodiment of the present invention.

DETAILED DESCRIPTION OF THE PREFERRED EMBODIMENT

Next, a best mode of carrying out the present invention is described based an embodiment described below with reference to figures. Although description is made paying attention to a voice interruption upon voice switching, the same manner can be applied also for a subtitle interruption upon subtitle switching.

Figure 8:
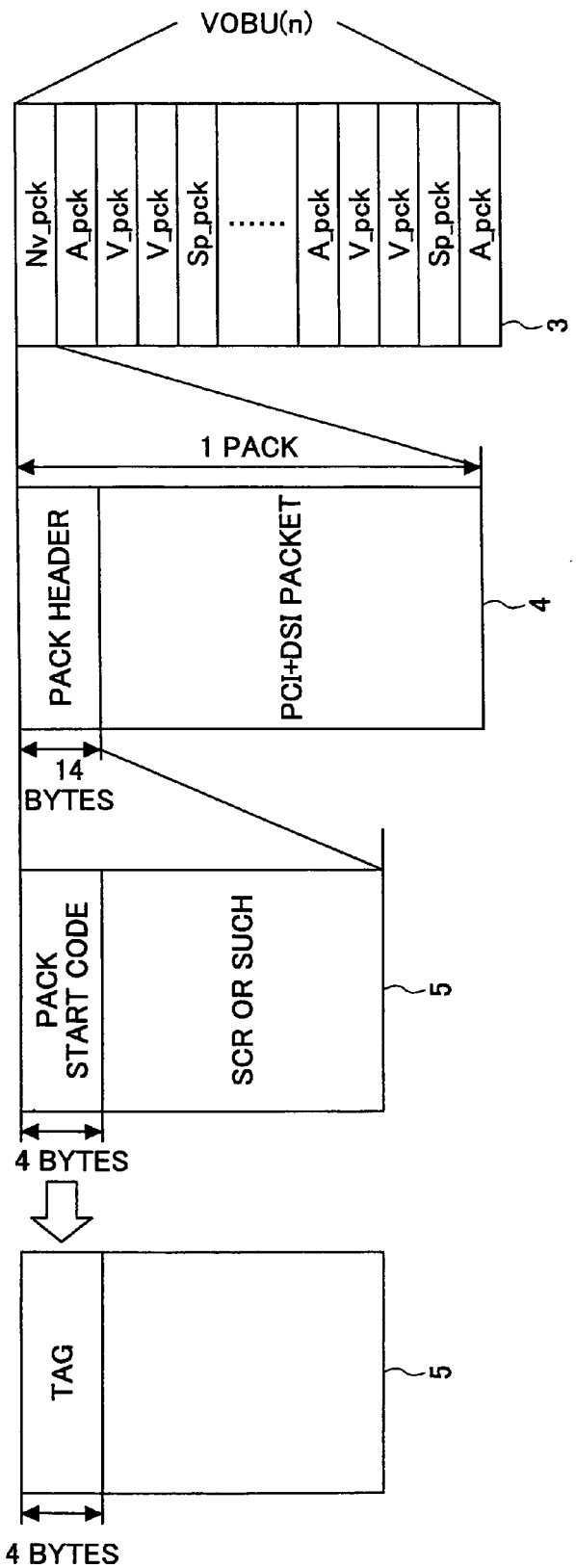
FIG. 8 illustrates addition of a tag.

First, with reference to FIG. 8, addition of tags by which the navy packs, video packs, audio packs and sub-picture packs separated from the same VOBU can be identified is described. FIG. 8 illustrates a tag adding manner.

VOBU 3 always starts from a single navy pack, and may include the video packs, audio packs or sub-picture packs subsequent to the navy pack. Hereinafter, any one of the navy pack, video pack, audio pack and sub-picture pack may be simply referred to as a pack.

The navy pack 4 includes a pack header having four bytes and a PCI+DSI packet. The video pack includes a pack header of 14 bytes and a video packet. The audio pack includes a pack header of 14 bytes and an audio packet. The sub-picture pack includes a pack header of 14 bytes and a sub-picture packet.

According to the present invention, a tag is written in a pack start code, located at the top of the pack header 5 and having four bytes. The tag has the same value when the pack to which the tag is thus added is separated from the same VOBU. For example, a value starting from 1 is written in the tag. Then, the value of the tag is incremented for each VOBU. Also for each of the video pack, audio pack and sub-picture pack, the tag is written in the top four bytes of the pack header 5.

Since the same tag is added to the pack separated from the same VOBU, dependency relationship between the navy pack and the other video pack, audio pack and sub-picture pack is maintained upon decoding. Thereby, in a data decoding device according to the present invention, it is possible to carry out decoding operation while observing the navy pack and the video pack, audio pack and sub-picture pack depending from the navy pack based on the tags. Hereafter, the value of the tag is referred to as a tag number.

Figure 9:
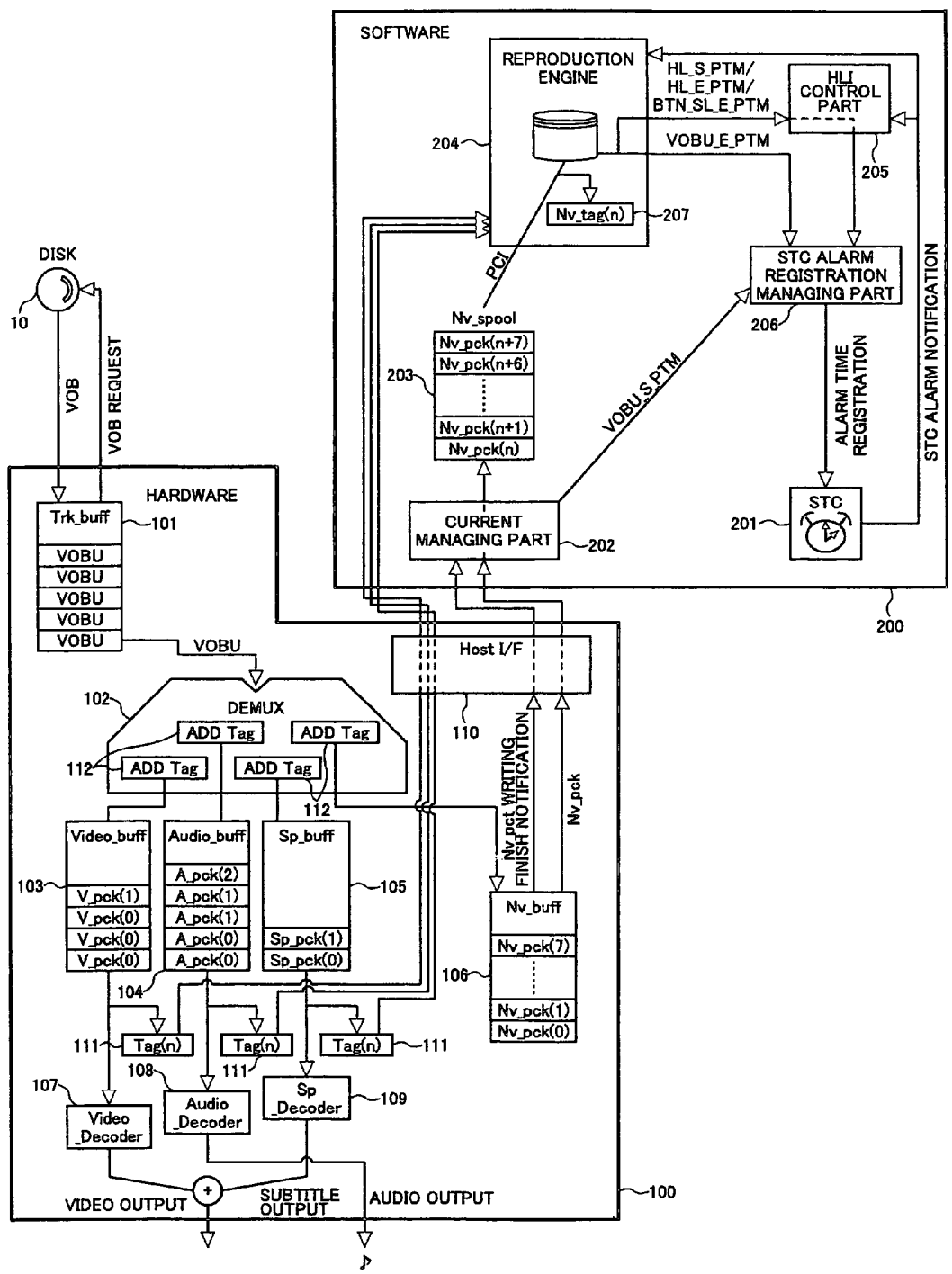
FIG. 9 shows a configuration diagram of a data decoding device for decoding VOB in one embodiment of the present invention.

FIG. 9 shows a configuration diagram of one embodiment of a data decoding device for decoding VOB according to one embodiment of the present invention. The data decoding device generally includes a hardware 100 and a software 200. First, description is made for the hardware 100.

The hardware 100 includes a track buffer 101, a demux 102, a video buffer 103, an audio buffer 104, a sub-picture buffer 105, a navy buffer 105, a video decoder 107, an audio decoder 108, a sub-picture decoder 109, a host interface part 110 and registers 111.

The VOB read out from a DVD disk 10 is stored in the track buffer 101 of the hardware 100. At this time, the VOB is managed for each VOBU unit with a separation therebetween. Subsequent to the track buffer 101, the demux 102 for separating the VOBU into respective packs of the above-mentioned four types, i.e., the navy pack, video pack, audio pack and sub-picture pack is connected.

Subsequent to the demux 102, the video buffer 103, the audio buffer 104, the sub-picture buffer 105 and the navy buffer 106 storing the respective packs are connected. Subsequent to the video buffer 103, the audio buffer 104 and the sub-picture buffer 105, the registers 111 storing the tags are connected respectively.

Specifically, the tag extracted from the video pack is stored in the register (V_tag) 111 provided subsequent to the video buffer 103. Similarly, the tag extracted from the audio pack is stored in the register (A_tag) 111 provided subsequent to the audio buffer 104. The tag extracted from the sub-picture pack is stored in the register (Sp_tag) 111 provided subsequent to the sub-picture buffer 105.

Bit streams read out from the video buffer 103, the audio buffer 104 and the sub-picture buffer 105 are decompressed by the video decoder 107, the audio decoder 108 and the sub-picture decoder 109, respectively, thus come to have a reproduced form of video, audio and subtitle, and are output from the hardware 100.

Next, description is made for the software 200. The software 200 includes an STC 201, a current managing part 202, a navy spool 203, a reproduction engine 204, an HLI control part 205 and an STC alarm registration managing part 206.

The current manager 202 reads out the navy pack from the navy buffer 106, and stores it in the navy spool 203. The reproduction engine 204 reads the navy pack from the navy spool 203, and carries out control for actual data reproduction. In the reproduction engine 204, a pointer (Nv_tag) 207 for storing the tag extracted from the navy pack is provided.

The reproduction engine 204 extracts the PCI from the navy pack thus read out from the navy spool 203, and transmits VOBU_E_PTM included in the PCI to the STC alarm registration managing part 206. The reproduction engine 204 transmits highlight information to the STC alarm registration managing part 206 via the HLI control part 205.

VOBU_S_PTM included in the PCI is transmitted to the STC alarm registration managing part 206 from the current managing part 202. VOBU_E PTM included in the PCI is transmitted to the STC alarm registration managing part 206 from the reproduction engine 204. HL_S_PTM, HL_E_PTM and BTN_SL_E_PTM included in the HLI are transmitted to the STC alarm registration managing part 206 from the reproduction engine 204 via the HLI control part 205.

The STC alarm registration managing part 206 registers the received data, i.e., time information included in the PCI, that is, VOBU_S_PTM, VOBU_E_PTM, HL_S_PTM, HL_E_PTM and BTN_SL_PTM in the STC 201 in the ascending order. The STC 201 starts time measurement simultaneously upon a start of data reduction, and, when a registered time has been reached, it notifies the reproduction engine 204 and the HLI control part 205 of an alarm.

The reproduction engine 204 can observe the registers 111 connected subsequent to the video buffer 103, the audio buffer 104 and the sub-picture buffer 105 via the host interface part 110.

Figure 1:
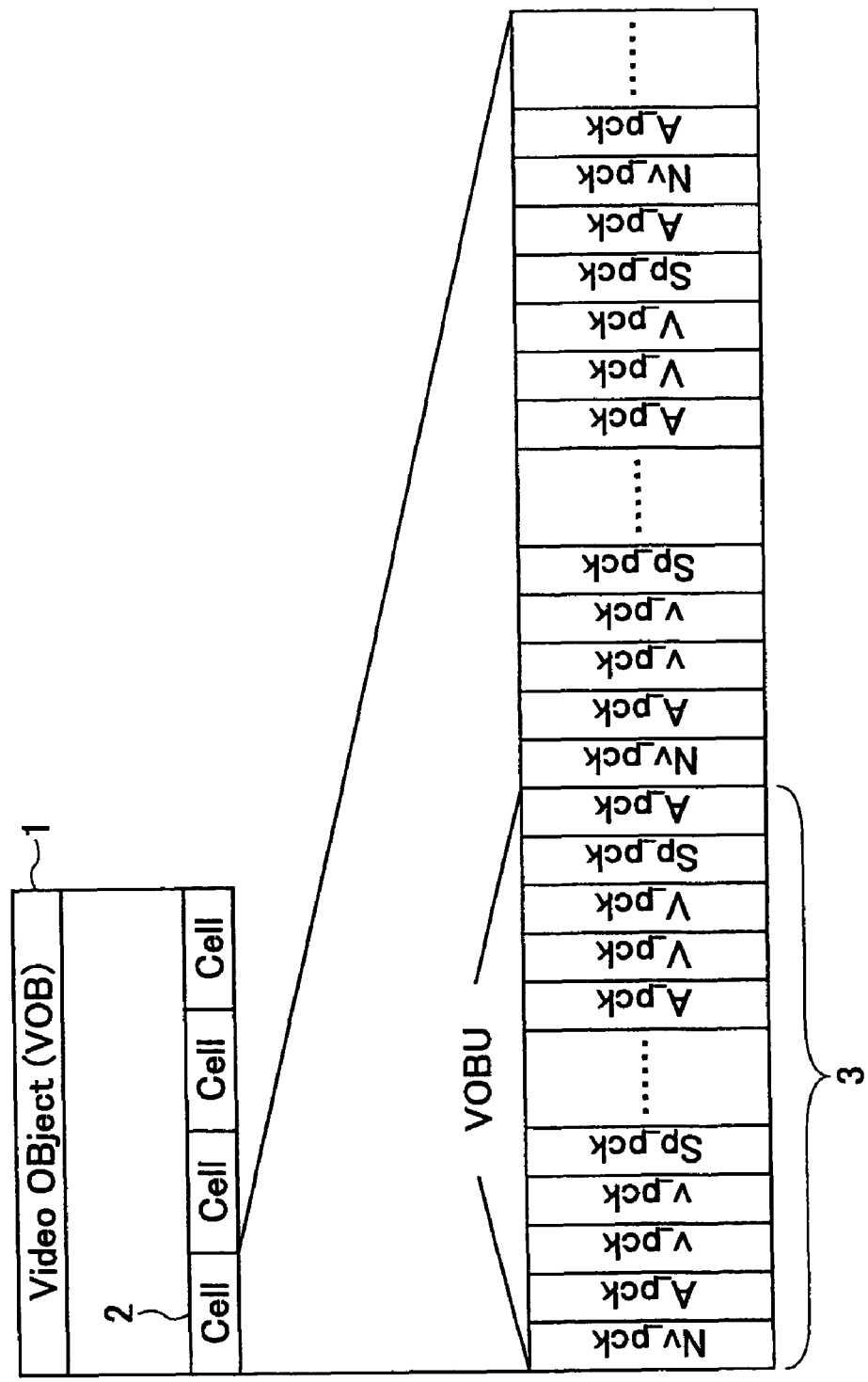
FIG. 1 shows a data structure of one example of VOB.
Figure 2:
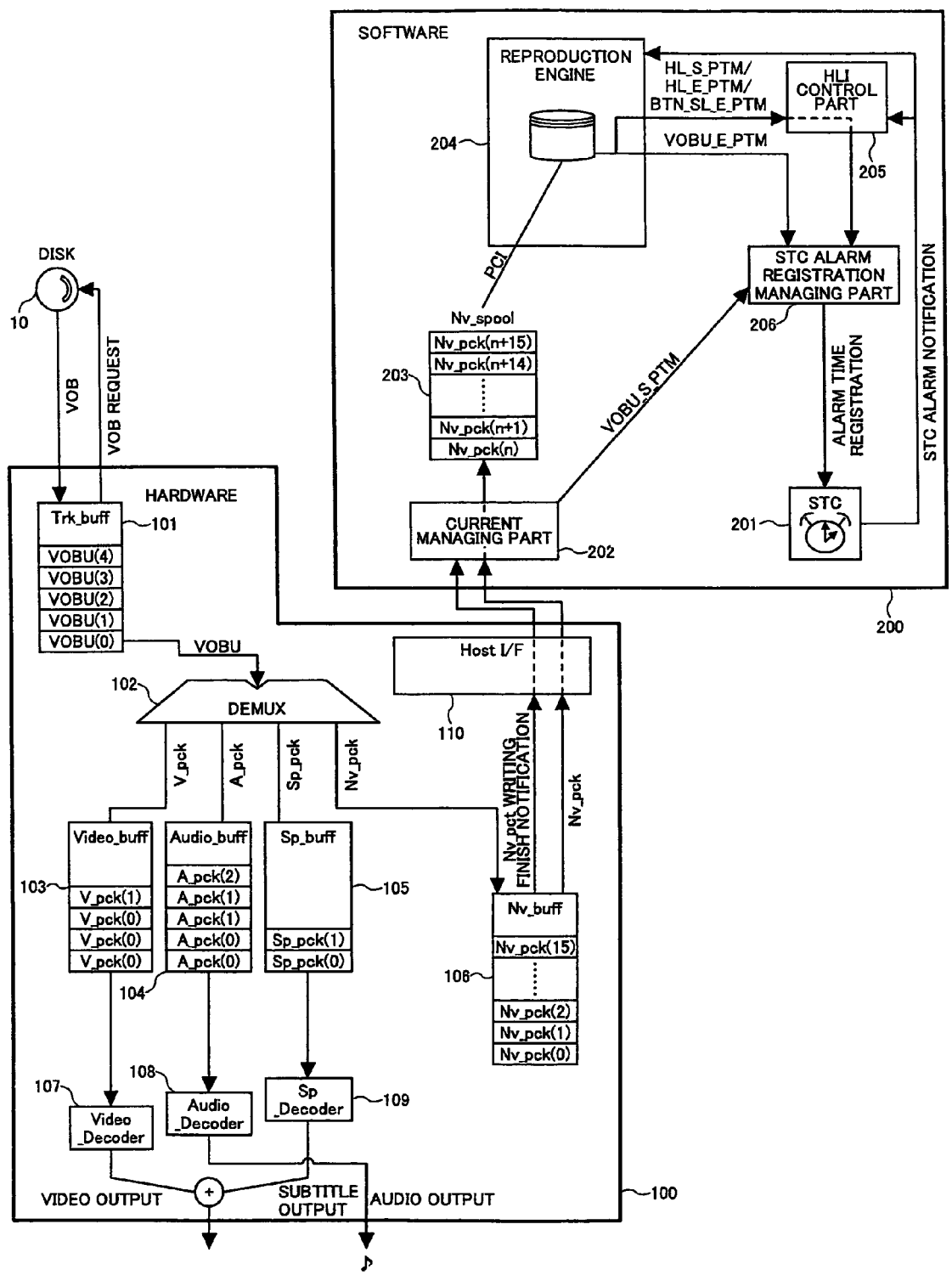
FIG. 2 shows a configuration diagram of one example of a data decoding device for decoding VOB.
Figure 3:
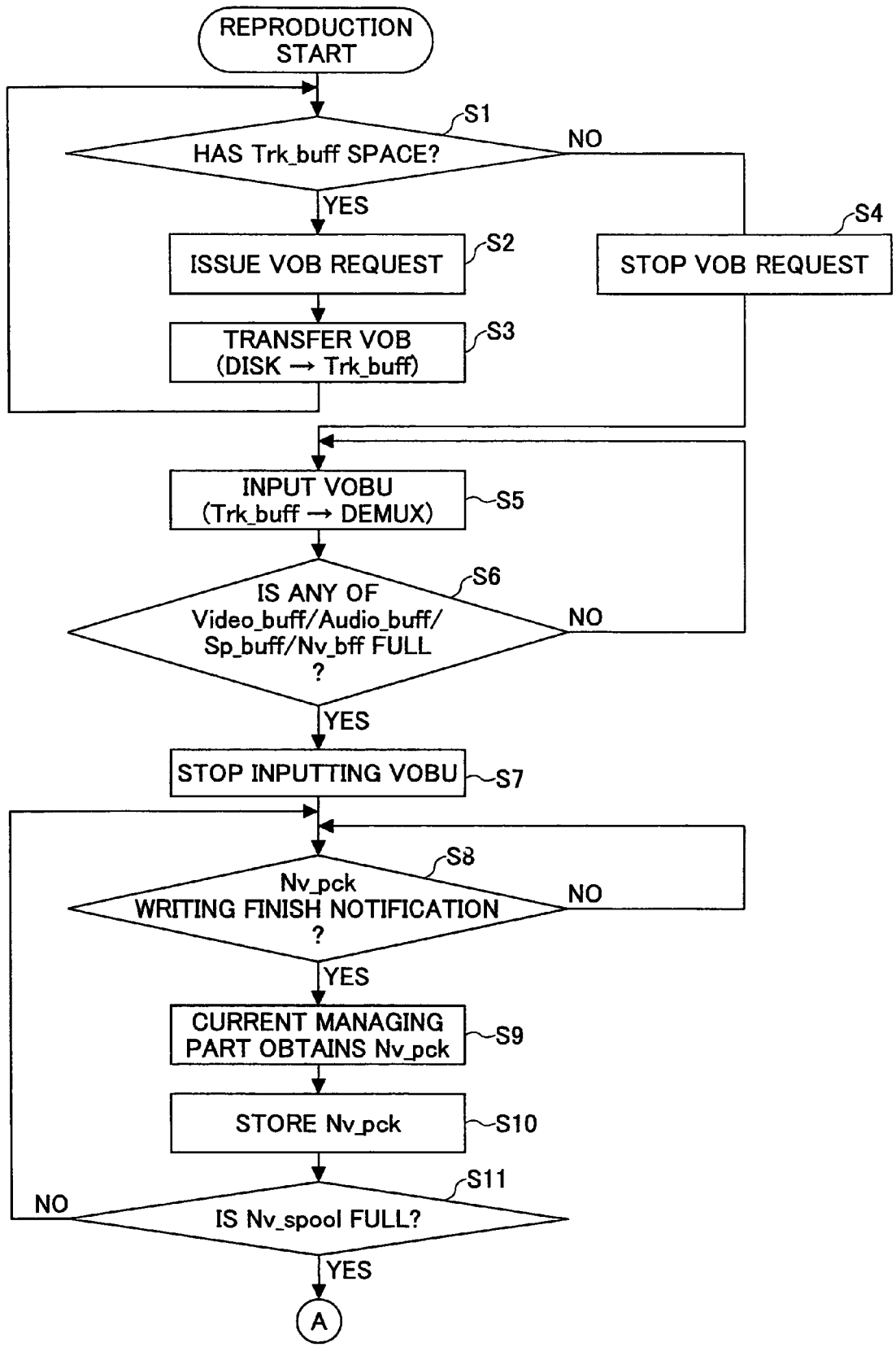
FIGS. 3 and 4 show a flow chart of operation of the data decoding device.
Figure 4:
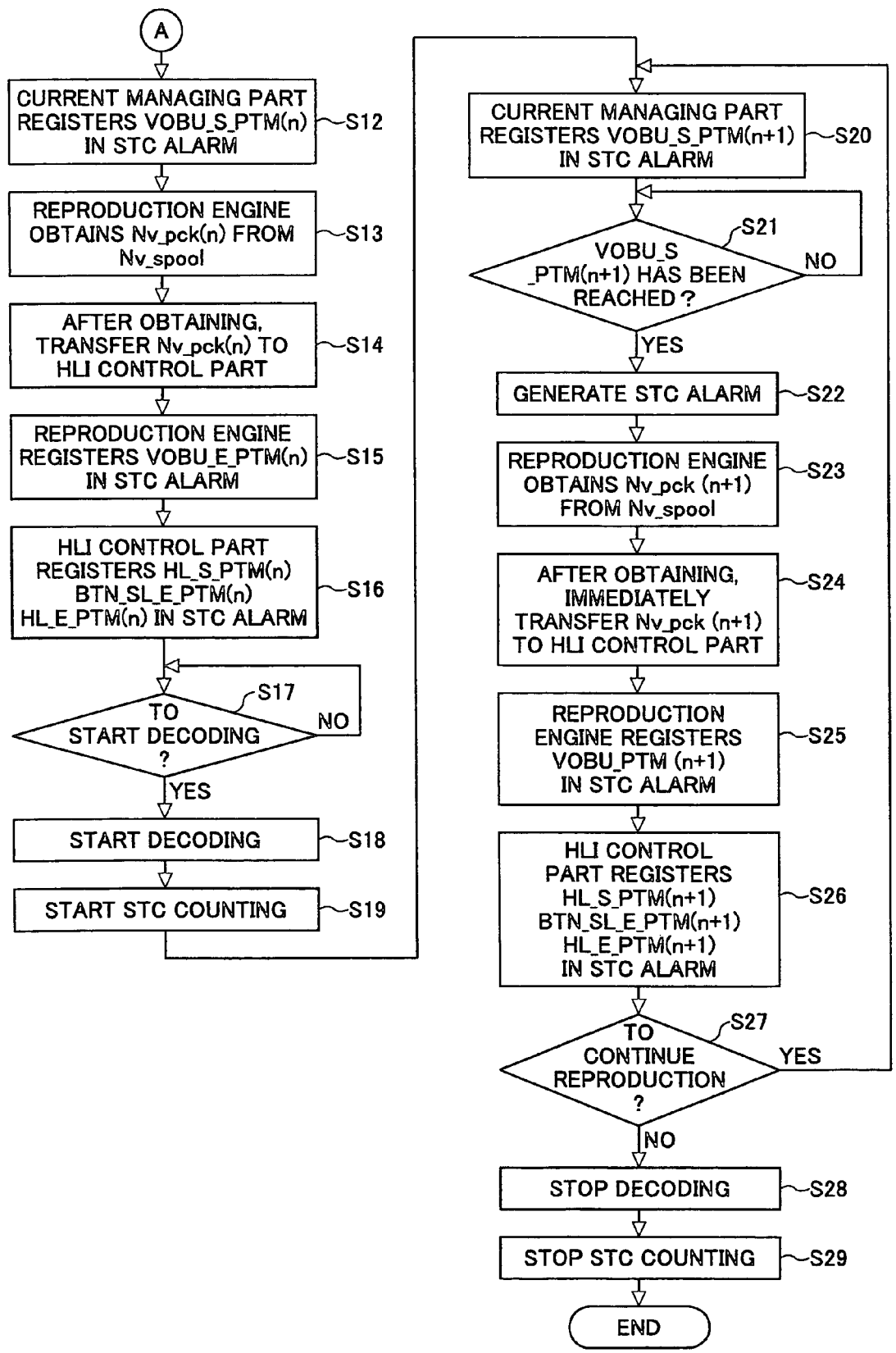

The data decoding device shown in FIG. 9 is one different from the data decoding device shown in FIG. 2 in that a system for processing the tags described above is added. For detail, the data decoding device of FIG. 9 is different from the data decoding device of FIG. 2 in that the data decoding device of FIG. 9 additionally has tag adders 112 provided in the demux 102, the registers 111 provided subsequent to the video buffer 103, the audio buffer 104 and the sub-picture buffer 105, the pointer 207 provided in the reproduction engine 204, and a system by which the reproduction engine 204 can observe the registers 111 via the host interface 110.

Figure 10:
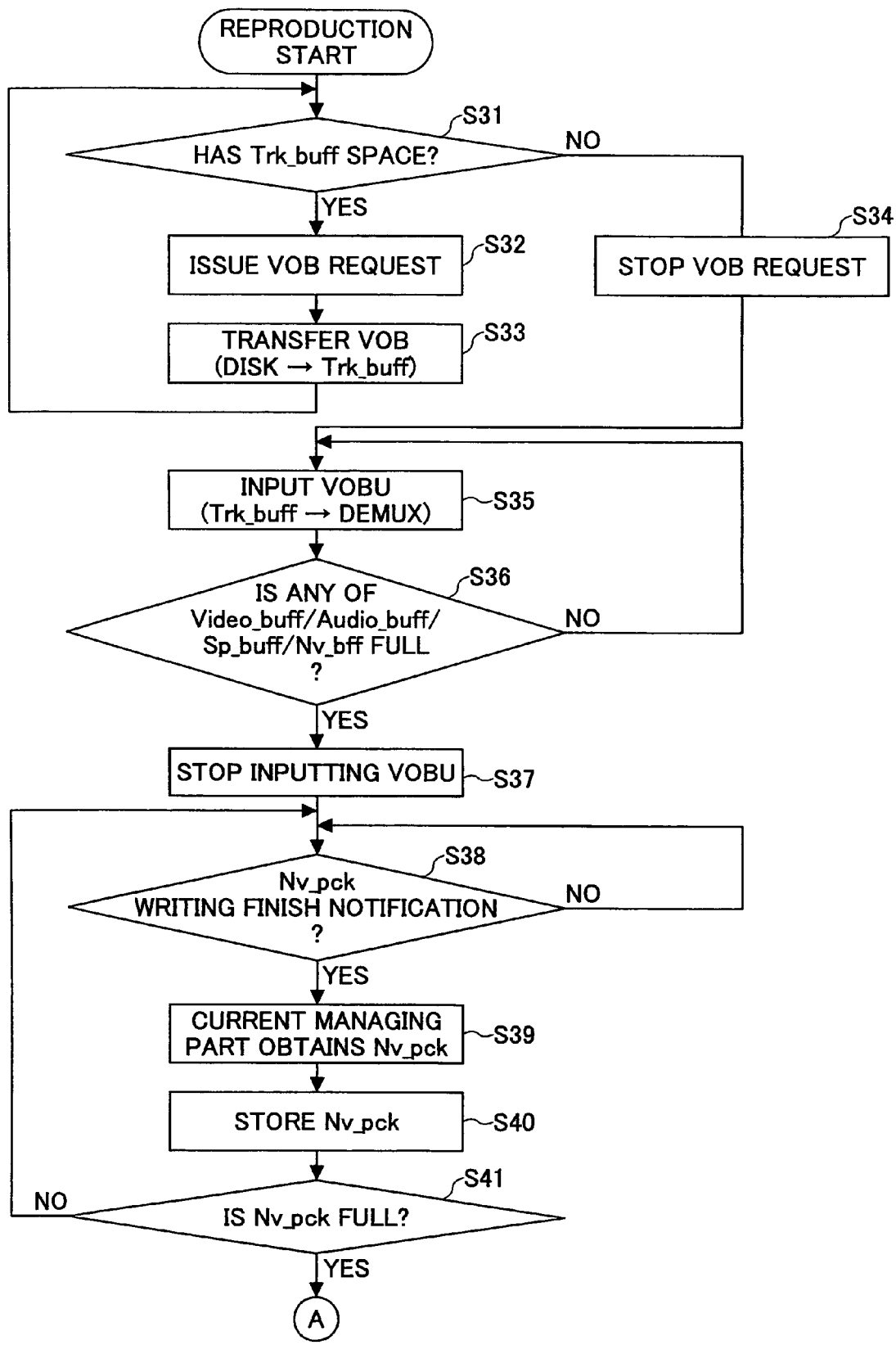
FIGS. 10 and 11 show a flow chart of operation of the data decoding device shown in FIG. 9.
Figure 11:
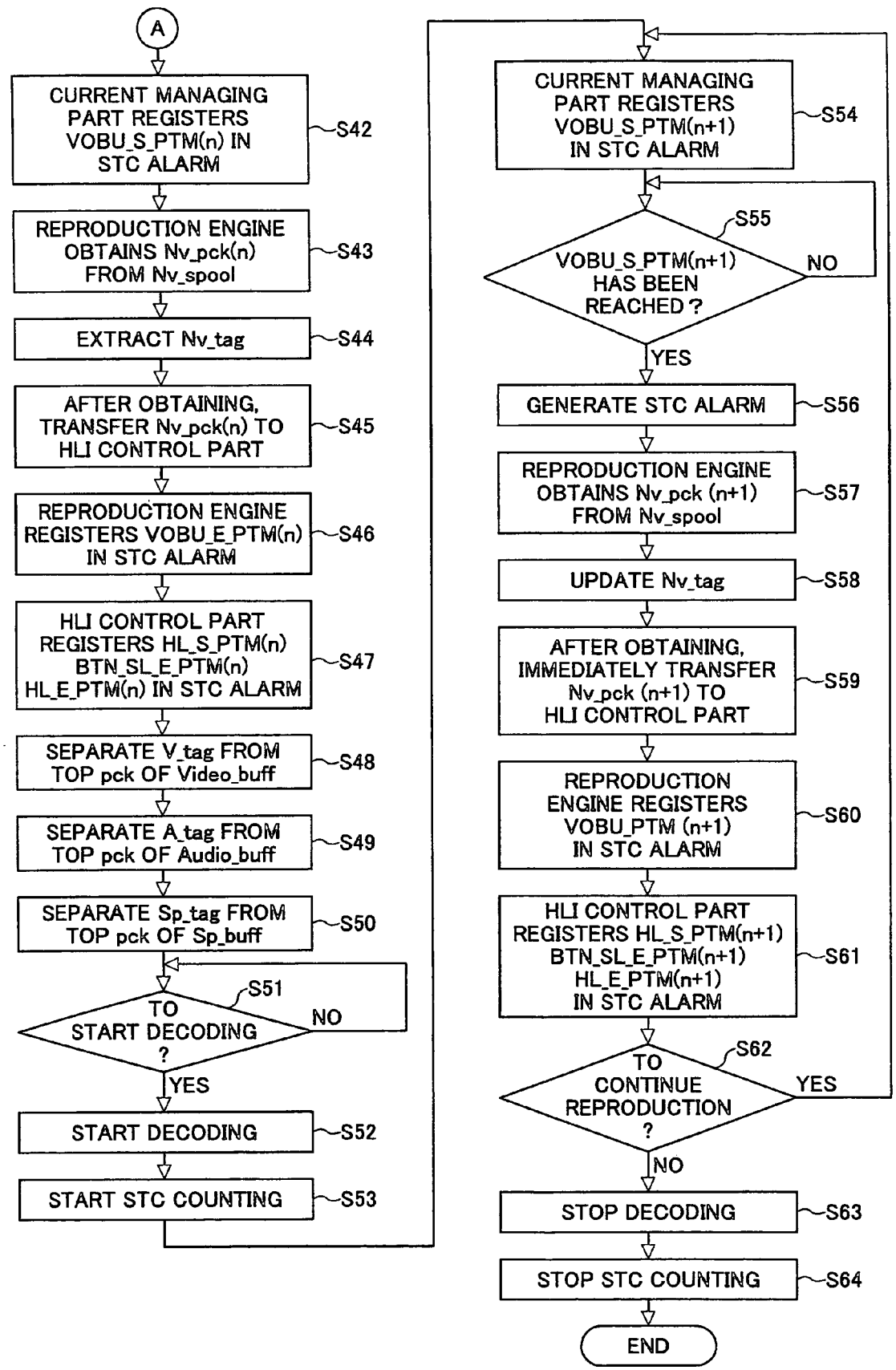

FIGS. 10 and 11 are a flow chart showing one example of operation of the above-described data decoding device according to the embodiment of the present invention. Here, description is made paying attention to the respective buffers and the navy pack. In Step S31, it is determined whether or not the track buffer 101 still has a free storage space.

When a free storage space exists (Yes in Step S31), a VBO request is issued in Step S32, and, in Step S33, VOB is transferred from the DVD disk 10 to the track buffer 101. After the processing of Step S33, Step S31 is returned to again. On the other hand, when there is no freer storage space in the track buffer 101 (No in Step S31), Step S34 is executed, in which issuance of the VOB request is stopped.

Then in Step S35, VOB thus stored in the track buffer 101 is input to the demux 102 for each unit of VOBU. VOBU thus input is separated into the above-mentioned respective four types of packs in the demux 102, and has the tags added thereto respectively as mentioned above by the tag adders 112. The demux 102 sends the packs thus having the tags added thereto respectively to the respective buffers, i.e., the video buffer 103, the audio buffer 104, the sub-picture buffer 104 and the navy buffer 106, which store the respective packs accordingly.

In Step S36, it is determined whether or not any one of the video buffer 103, the audio buffer 104, the sub-picture buffer 105 and the navy buffer 106 has no more free storage space. When all of the above-mentioned four buffers still have respective free storage spaces (No in Step S36), Step S35 is returned to, in which VOBU is again input to the demux 102 from the track buffer 101. On the other hand, when any one of these four buffers has no more free storage space (Yes in Step S36), Step S37 is carried out in which input of VOBU to the demux 102 is stopped. That is, when any one of the four buffers has no more free storage space, input of VOBU to the demux 120 is stopped also with respect to the other buffers still having free storage spaces.

Then, in Step S38, it is determined whether or not the navy pack is stored in the navy buffer 106. When no navy pack is stored yet in the navy buffer 106 (No in Step S38), the processing of Step S38 is repeated. On the other hand, when the navy pack is already stored in the navy buffer 106 (Yes in Step S38), the current managing part 202 is notified of a navy pack writing finish notification. Then in Step S39, the current managing part 202 obtains the navy pack from the navy buffer 106 via the host interface part 110.

Then, in Step S40, the current managing part 202 stores, in the navy spool 203, the navy pack thus obtained from the navy buffer 106. In Step S41, it is determined whether or not the navy spool 203 comes to have no more free storage space. When the navy spool 203 still has a free storage space (No in Step S41), the current managing part 202 repeats the processing of Steps S38 through S41, and sends the navy pack, obtained from the navy buffer 106, to the navy spool 203, which thus stores it.

When the navy spool 203 comes to have no more free storage space (Yes in Step S41), the current managing part 202 executes Step S42, and thus, registers VOBU_S_PTM(0) in the STC alarm registration managing part 206 in prior to other parameters. Then in Step S43, the reproduction engine 204 obtains the first navy pack Nv_pck(0) from the navy spool 203.

In Step S44, the reproduction engine 204 extracts the tag from the navy pack NV_pck(0), and stored it in the pointer 207. Then in Step S45, the reproduction engine 204 extracts HLI from the navy pack Nv_pck(0), and transmits it to the HLI control part 205. In Step S46, the reproduction engine 204 registers VOBU_E_PTM(0) in the STC alarm registration managing part 206.

In Step S47, the HLI control part 205 registers HL_S_PTM (0), HL_E_PTM(0) and BTN_SL_E_PTM(0) in the STC alarm registration managing part 206.

Then, in Step S48, the tag is extracted from the top video pack V_pck(0) stored in the video buffer 103, and is then stored in the register (V_tag) 111. Similarly, in Step S49, the tag is extracted from the top audio pack A_pck(0) stored in the audio buffer 104, and is then stored in the register (A_tag) 111. In Step S50, the tag is extracted from the top video pack Sp_pck(0) stored in the sub-picture buffer 105, and is then stored in the register (Sp_tag) 111. At this time, all the tag numbers stored in the register (V_tag) 111, the register (A_tag) 111 and the register (Sp_tag) 111 have the value of '1'.

In the processing so far, reproduction preparation for the first navy pack Nv_pck(0) is completed. The processing of Steps S42 through S50 is called 'reproduction standby'. In Step S51, it is determined whether or not reproduction is started therefor. Processing of Step S51 is repeated unless it is determined that reproduction is to be started (No in Step S51). On the other hand, when it is determined that reproduction is to be started (Yes in Step S51), decoding of the bit streams stored in the video buffer 103, the audio buffer 104 and the sub-picture buffer 105 is started. In Step S53, the STC 201 starts counting.

Then in Step S54, the current managing part 202 registers VOBU_S_PTM(1) in the STC alarm registration managing part 206. In Step S55, it is determined whether or not a reproduction start time VOBU_S_PTM(1) for the second navy pack Nv_pck(1) is reached.

When it is determined that the reproduction start time VOBU_S_PTM(1) is not yet reached (No in Step S55), the processing of Step S55 is repeated. On the other hand, when it is determined that the reproduction start time VOBU_S_PTM(1) for the second navy pack Nv_pck(1) has been reached (Yes in Step S55), the STC 201 executes Step S56, and thus, it notifies the reproduction engine 204 and the HLI control part 205 of an alarm. In Step S57, the reproduction engine 204 obtains the second navy pack Nv_pck(1) from the navy spool 203.

In Step S58, the reproduction engine 204 extracts the tag from the second navy pack Nv_pck(1), and stores in the pointer 207. That is, the tag stored in the pointer is updated.

In Step S59, the reproduction engine 204 extracts HLI from the second navy pack Nv_pck(1) and transmits it to the HLI control part 205. In Step S60, the reproduction engine 204 registers VOBU_E_PTM(1) in the STC alarm registering managing part 206.

In Step S61, the HLI control part 205 registers HL_S_PTM (1), HL_E_PTM(1) and BTN_SL_E_PTM(1) in the STC alarm registration managing part 206.

In the register (V_tag) 111, the tag extracted from the video pack V_pck(1) stored in the video buffer 103 is stored. Similarly, in the register (A_tag) 111, the tag extracted from the audio pack A_pck(1) stored in the audio buffer 104 is stored. In the register (Sp_tag) 111, the tag extracted from the sub-picture pack Sp_pck(1) stored in the sub-picture buffer 105 is stored.

In Step S62, it is determined whether or not reproduction is continued. When it is determined that reproduction is continued (Yes in Step S62), the processing of Steps S54 through S62 is carried out for the further subsequent navy pack. That is, as a result of the processing of Steps S54 through S62 being repeated, data reproduction from the DVD disk is carried out.

On the other hand, when it is determined that reproduction is no more continued (No in Step S62), decoding of the bit streams stored in the video buffer 103, the audio buffer 104 and the sub-picture buffer 105 is stopped. Then in Step S64, the STC 201 stops counting, and holds the current count value.

That is, in the flow chart of FIGS. 10 and 11, every time when the reproduction engine 204 obtains the navy pack Nv_pck(n+1) from the navy spool 203, the tag stored in the pointer 207 is updated. Similarly, in the register (V_tag) 111, the tag extracted from the video pack V_pck(n+1) stored in the video buffer 103 is then stored. In the register (A_tag) 111, the tag extracted from the audio pack A_pck(n+1) stored in the audio buffer 104 is then stored. In the register (Sp_tag) 111, the tag extracted from the sub-picture pack Sp_pck(n+1) stored in the sub-picture buffer 105 is then stored.

Accordingly, when decoding is carried out normally, the tag number stored in the pointer 207 and the tag number stored in the register (V_tag) 111, the register (A_tag) 111 and the register (Sp_tag) 111 agree with each other.

Figure 5:
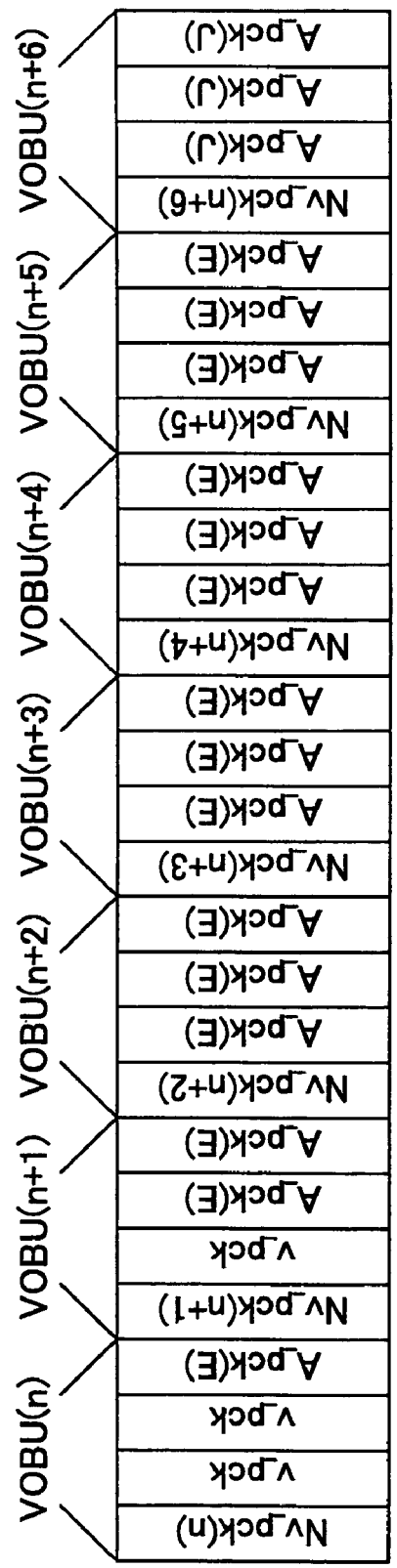
FIG. 5 shows a data structure of one example of VOBU.
Figure 6:
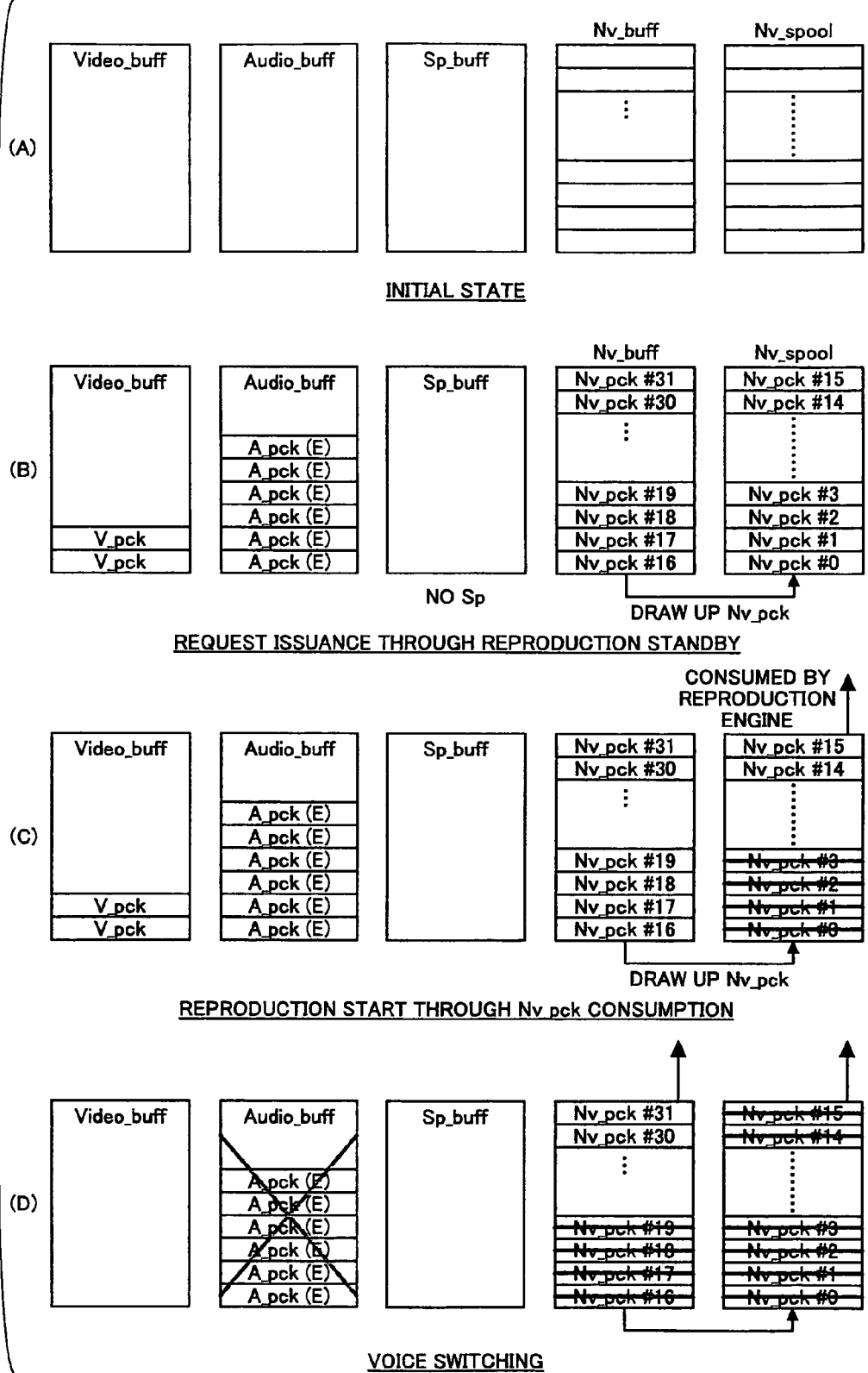
FIGS. 6 and 7 show a state transition diagram of four buffers and a navy spool upon reproduction of VOBU.
Figure 7:
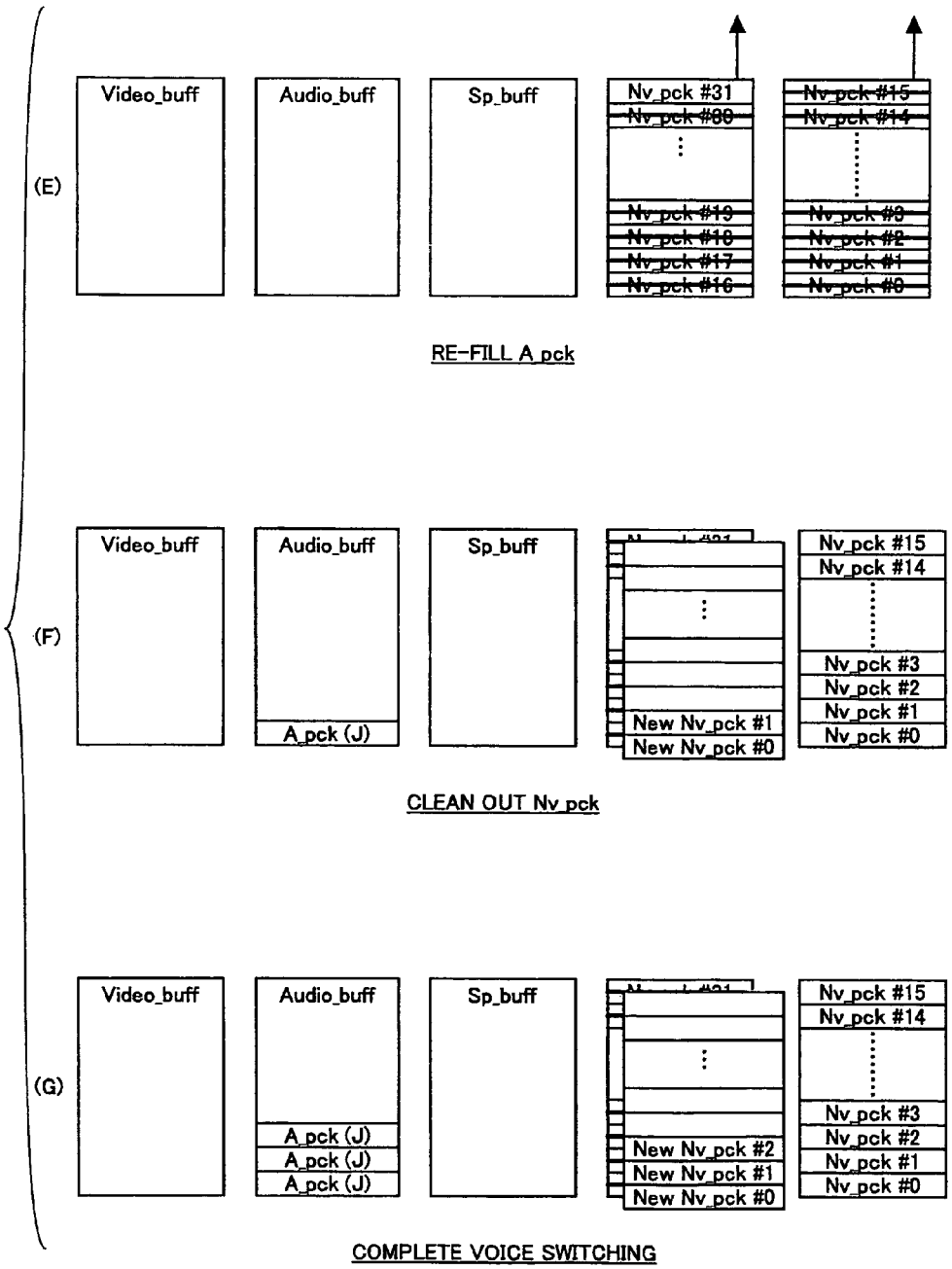

Next, a state transition of the four buffers, i.e., the video buffer 103, the audio buffer 104, the sub-picture buffer 105 and the navy buffer 105, the navy spool 203, the register 111 and the pointer 207 occurring when VOBU such as that shown in FIG. 5 is reproduced by the data decoding device according to the embodiment of the present invention and voice switching is carried out from English to Japanese, is described with reference to FIGS. 12 and 13.

Figure 12:
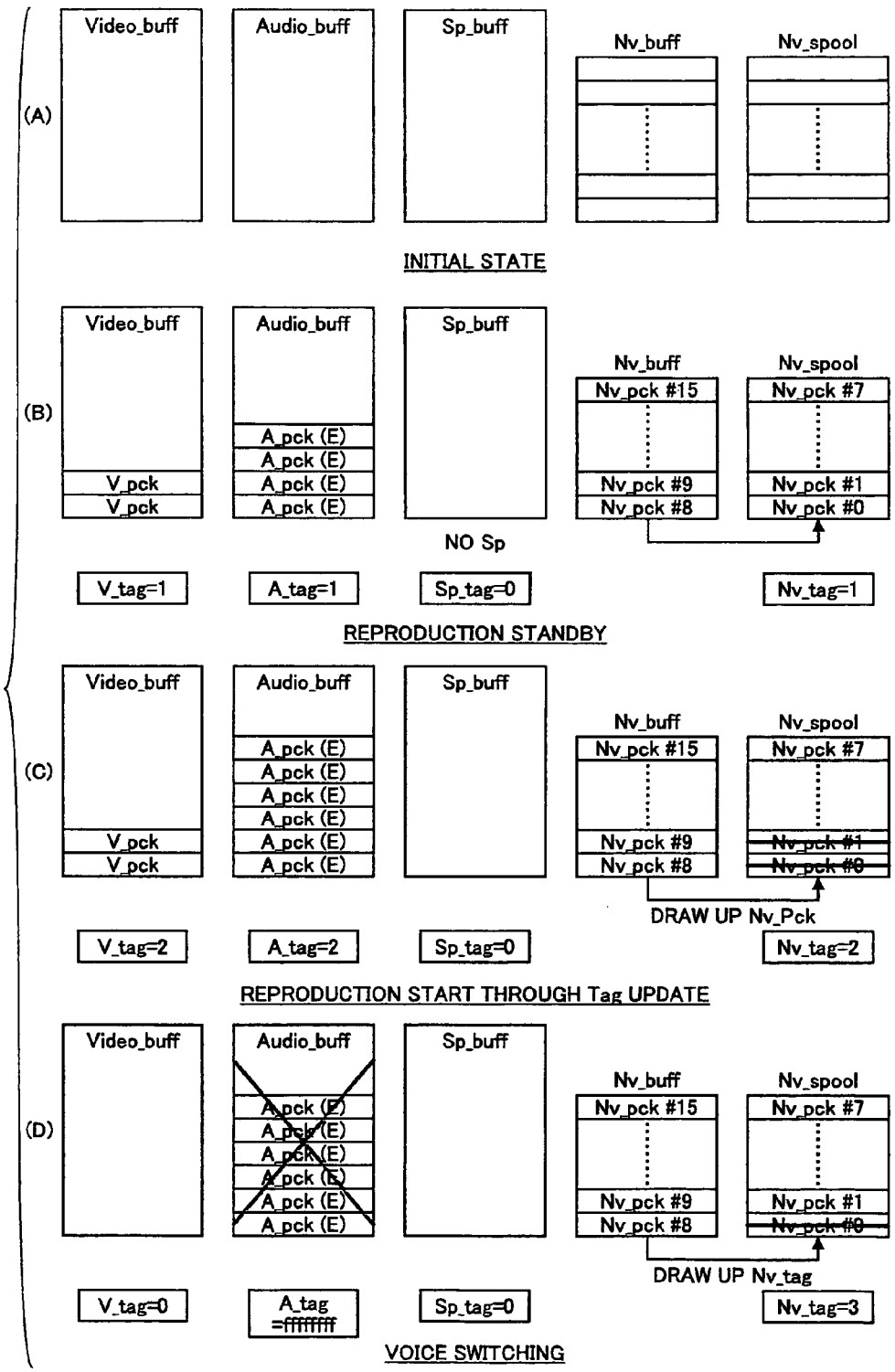
FIGS. 12 and 13 show a state transition diagram of four buffers, a navy spool and a register upon reproduction of VOBU in the data decoding device shown in FIG. 9.

A state of FIG. 12, (A) is an initial state before a start of reproduction. In this state, the four buffers and the navy spool 203 are free as shown. The track buffer not shown in FIGS. 12 and 13 is also free.

Since the track buffer 101 is free in this state of FIG. 12, (A), a VOB request is issued, and transfer of VOB from the DVD disk 10 to the track buffer 101 is started. After that, VOB thus stored in the track buffer 101 is input to the demux 102 for each VOB unit, is separated into the respective four types of packs described above by the demux 102, which are than stored in the respective buffers, after the above-mentioned tags are added thereto respectively. After that, the navy buffer 106 comes to have no more free storage space, input of VOBU to the demux 102 is stopped, and issuance of the VOB request is stopped.

A state of FIG. 12, (B) is a state of the above-mentioned reproduction standby. In this state, the reproduction engine 204 obtains the top navy pack Nv_pck(0) from the navy spool 203, extracts the tag from the navy pack Nv_pck(0), and stores the tag in the pointer 207. At this time, the tag number stored in the pointer 207 is "1".

Similarly, the tags are extracted from the top video pack V_pck(0) and the top audio pack A_pck(0) stored in the video buffer 103 and the audio buffer 104, respectively, and are stored in the registers (V_tag) 111 and the register (A_tag) 111, respectively. At this time, the tag numbers stored in the register (V_tag) 111 and the register (A_tag) 111 are also "1".

Since no sub-picture pack is multiplexed in VOBU of FIG. 5, no sub-picture pack is stored in the sub-picture buffer 105. Therefore, the tag number stored in the register (Sp_tag) 111 is kept unchanged as being "0".

In a state of FIG. 12, (C), reproduction is started, the reproduction engine 204 reads out the navy packs from the navy spool 203 and consumes them. In the state of FIG. 12, (C), the reproduction engine 204 obtains the top navy pack Nv_pck(1) from the navy spool 204, extracts the tag from the navy pack Nv_pck(1), and stores the tag in the pointer 207. At this time, the tag number stored in the pointer 207 thus becomes "2".

Similarly, the video packs and the audio packs stored in the video buffer 103 and the audio buffer 104 respectively are decompressed by the video decoder 107 and the audio decoder 108, respectively, thus become a form of video and audio, respectively, are output from the hardware 100, and thus, are consumed. In the state of FIG. 12, (C), the tags are extracted from the subsequent video pack V_pck(1) and audio pack A_pck(1) stored in the video buffer 103 and the audio buffer 104, and are stored in the register (V_tag) 111 and the register (A_tag) 111, respectively. At this time, each of the tag numbers stored in the register (V_tag) 111 and the register (A_tag) 111 also becomes "2" as shown. It is note that the tag numbers of the register (V_tag), the register (A_tag), the register (Sp_tag) and the pointer are indicated as V_tag, A_tag, Sp_tag and Nv_tag in FIGS. 12 and 13).

In the state of FIG. 12, (C), the audio packs A_pck(E) corresponding to English voice are stored in the audio buffer 104, and thus, an English voice is output. In FIGS. 12 and 13, the navy packs consumed are crossed off by canceling lines (-).

Then, it is assumed that a user issues an instruction to switch the voice language. Upon issuance of this voice switching instruction, the data decoding device flashes (deletes) the audio packs A_pck(E) currently stored in the audio buffer 104. After that, the register (A_tag) 111 is rewritten by a special value 'FFFFFFFF' (all 1's) which means that the system itself has flashed all the packs stored in the buffer for a certain reason.

A state of FIG. 12, (D) is a state in which, the voice switching instruction has been issued, the audio packs have been flashed from the audio buffer 104, and the register (A_tag) 111 has been rewritten into 'FFFFFFFF'. The video packs stored in the video buffer 103 have been consumed, and thus, the video buffer 103 has become free. As a result, the register (V_tag) 111 has a special value '0' indicating that no pack exists, as shown.

The reproduction engine 204 observes the tag numbers stored in the register (V_tag) 111, the register (A_tag) 111 and the pointer 207 each time of updating the pointer 207. When the tag numbers stored in the register (V_tag) 111, the register (A_tag) 111 and the pointer 207 do not agree with each other, the reproduction engine 204 further obtains the occupied amounts in the video buffer 103, the audio buffer 104 and the sub-picture buffer 105.

Figure 14:
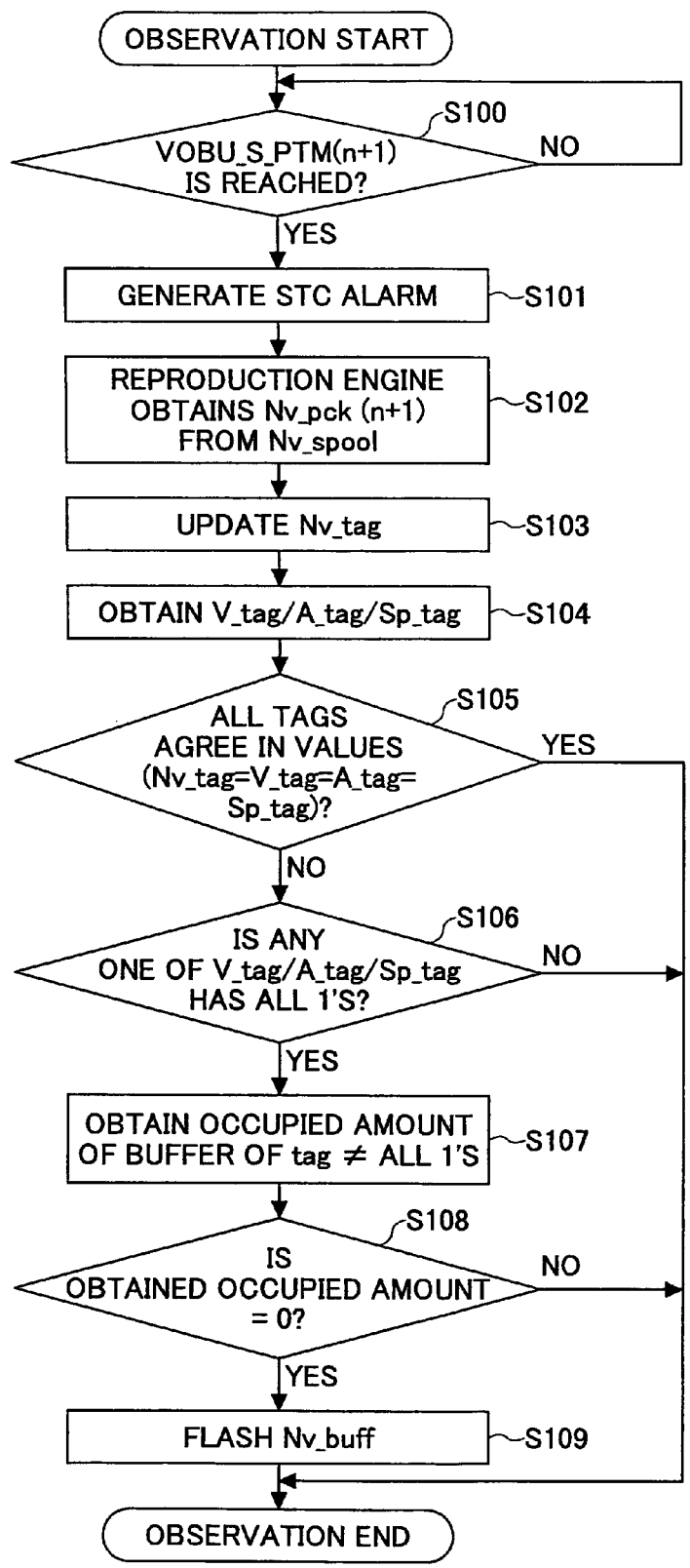
FIG. 14 shows a flow chart of one example of navy buffer flash processing according to the embodiment of the present invention.

Then, according to the flow chart of FIG. 14, the reproduction engine 204 determines whether or not the navy packs stored in the navy buffer 106 should be flashed. FIG. 14 shows a flow chart of one example of navy buffer flashing processing.

In Step S100, it is determined whether or not the reproduction start time VOBU_S_PTM(n+1) of the (n+2)-th navy pack Nv_pck(n+1) is reached. When it is determined that the reproduction start time VOBU_S_PTM(n+1) has not been reached (No in Step S100), the processing of Step S100 is repeated.

When it is determined that the reproduction start time VOBU_S_PTM(n+1) has been reached (Yes in Step S100), the STC 201 executes Step S101, and notifies the reproduction engine 204 and the HLI control part 205 of an alarm. Then in Step S102, the reproduction engine 204 obtains the navy pack Nv_pck(n+1) from the navy spool 203. Then, in Step S103, the reproduction engine 204 extracts the tag from the navy pack Nv_pck(n+1), and stores the tag in the pointer 207. That is, the tag stored in the pointer 207 is updated.

Then, in Step S104, the reproduction engine 204 obtains the tag numbers from the register (V_tag) 111, the register (A_tag) 111 and the register (Sp_tag) 111. Then, in Step S105, the reproduction engine 204 determines whether or not all the tag numbers obtained from the register (V_tag) 111, the register (A_tag) 111, the register (Sp_tag) 111 and the pointer 207 agree with each other.

When all the tag numbers agree with each other (Yes in Step S105), the reproduction engine 204 determines that the state is normal, and finishes the processing of the flow chart shown in FIG. 14. On the other hand, when all the tag numbers do not agree with each other (No in Step S105), the reproduction engine executes Step S106. Then, in Step S106, the reproduction engine 204 determines whether or not any one of the tag numbers obtained from the register (V_tag) 111, the register (A_tag) 111 and the register (Sp_tag) 111 is all 1's.

When it is determined that none of the tag numbers is all 1's (No in Step S106), the reproduction engine 204 determines not to flash the navy buffer 105, and finishes the processing of the flow chart of FIG. 14. In this case, in consideration of a possibility that reading of the navy pack has been failed in, the navy buffer 106 is not flashed for the purpose of using the immediately preceding navy pack for a substitution. When it is determined that any of the tag numbers is all 1's (Yes in Step S106), the reproduction engine 204 executes Step S107.

In Step S107. the reproduction engine 204 obtains the occupied amount of each of only some of the video buffer 103, the audio buffer 104 and the sub-picture buffer 105 for each of which the register (V_tag) 111, the register (A_tag) 111 or the register (Sp_tag) 111 does not have the tag number of all 1's. Then in Step S108, the reproduction engine 204 determines whether or not each occupied amount obtained in Step S107 is 0. When any occupied amount obtained is not 0 (No in Step S108), the reproduction engine 204 determines not to flash the navy buffer 106, and finishes the processing of the flow chart of FIG. 14.

In this case, any one of the video buffer 103, the audio buffer 104 and the sub-picture buffer 105 has been flashed for some reason. However, the packs to be reproduced still remain in the buffers which have not been flashed. Accordingly, the navy buffer 106 is not flashed. When each occupied amount is 0 (Yes in Step S108), the reproduction engine 204 executes Step S109, flashes (i.e., deletes all the packs from) the navy buffer 106, and finishes the processing of the flow chart of FIG. 14.

Figure 13:
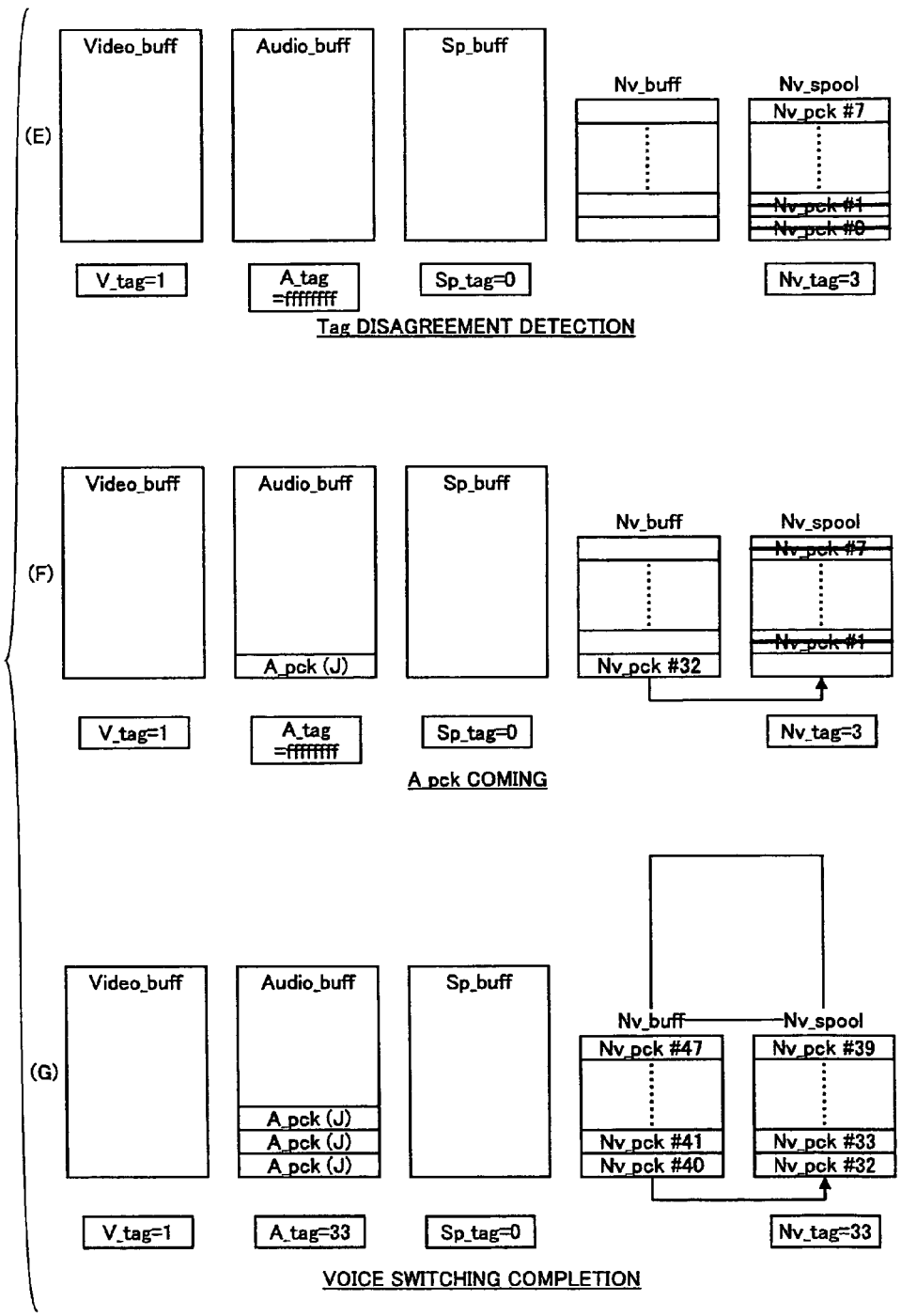

In a state of FIG. 13, (E), the navy buffer 106 is flashed, and thus, becomes free. When the navy buffer 106 thus becomes free, immediately new VOBU is input to the demux 102, and, as shown in FIG. 13, (F), the audio pack A_pk(J) is given the audio buffer 104. After that, as shown in FIG. 13, (G), storage of the audio pack(J) in the audio buffer 104 is waited for, and, after it is stored, reproduction is started.

The value of the tag added to each pack of the four types and the value of the tag stored in the registers 111 and the pointer 207 are changed as shown in FIG. 15. FIG. 15 shows the value of the tag added to each pack of the four types and the value of the tag stored in the registers and the pointer.

In the data decoding device shows in FIG. 2, as mentioned above, a time for actually consuming the navy packs is required for voice switching. On the other hand, according to the data decoding device in the embodiment of the present invention, maximum 0.5 seconds is require after the audio buffer 104 is flashed, that is, only a time for consuming one navy pack is required. Accordingly, in the data decoding device according to the present invention, merely a thus-shortened voice interruption occurs upon voice switching, and the user hardly recognizes voice interruption upon voice switching.

That is, when the video buffer 103, the audio buffer 104 and the sub-picture buffer 105 have no video pack, no audio pack and no sub-picture pack to be controlled, the navy buffer 106 is flashed. As a result, it is possible to shorten the voice interruption upon voice switching.

According to the present invention, dependency relationship between the navy pack and the video pack, the audio pack and the sub-picture pack is maintained upon decoding. Thereby, it is possible to determine whether or not there should occur a problem if the navy packs are deleted. Then, based on this determination result, it is possible to delete the navy packs appropriately if necessary.

The track buffer 101 and the demux 102 act as an inverse multiplexing part; and the other part of the hardware 100 than the track buffer 101 and the demux 102 as well as the software 200 act as a decoding part, for example.

Further, the present invention is not limited to the above-described embodiment, and variations and modifications may be made without departing from the basic concept of the present invention claimed below.

The present application is based on Japanese Priority Application No. 2004-270071 filed on Sep. 16, 2004, the entire contents of which are hereby incorporated herein by reference.

What is claimed is:

1. A data decoding device for decoding compressed and coded data, comprising:
an inverse multiplexing part configured to separate compressed and coded data into a plurality of unit data, then separate the unit data into more than one types of data packs, and, for each unit data, add a tag to each of the data packs such that the data packs can be identified as originating from the same unit data; and
a decoding part configured to monitor the tags added to the data packs, while carrying out decoding of the data packs separated from the same unit data, for each unit data.

2. The data decoding device as claimed in claim 1, wherein:
after separating the unit data into more than one types of data packs, said inverse multiplexing part adds the tags to a pack header configuring a part of each of the data packs.

3. The data decoding device as claimed in claim 1, wherein:
said inverse multiplexing part adds, as the tags, a value incremented by one for each unit data.

4. The data decoding device as claimed in claim 1, wherein:
after adding the tag to the data pack, said inverse multiplexing part stores the data pack in a buffer determined according to the type of the data pack.

5. The data decoding device as claimed in claim 4, wherein:
said inverse multiplexing part separates a video object (VOB) according to a DVD standard into a plurality of video object units (VOBU), and further separates the video object unit into a navy pack, a video pack, an audio pack, and a sub-picture pack, and adds the tags thereto such that the navy pack, the video pack, the audio pack and the sub-picture pack may be identified as originating from the same VOBU.

6. The data decoding device as claimed in claim 5, wherein:
when reading the navy pack from the buffer determined according to the type of the navy pack, said decoding part separates the tag added to the navy pack therefrom and stores it in a pointer, while, when reading the video pack, audio pack and sub-picture pack from the respective buffers determined according to the respective types of the video pack, audio pack and sub-picture pack, said decoding part separates the tags added to the video pack, audio pack and sub-picture pack therefrom and stores them in registers.

7. The data decoding device as claimed in claim 6, wherein:
said decoding part observes the tags stored in the pointer periodically, and, based on agreement or disagreement in the tags stored of the pointer and the registers, determines whether or not the navy pack should be deleted from the buffer determined according to the type of the navy pack.

8. The decoding device as claimed in claim 7, wherein:
said decoding part deletes all the audio packs or the sub-picture packs from the buffer determined according to the type of the audio pack or the sub-picture pack, as a procedure of audio switching or subtitle switching, and rewrites the tags added to the audio packs or the sub-picture packs and stored in the register into predetermined values.

9. The data decoding device as claimed in claim 8, wherein:
said decoding part deletes the navy packs stored in the buffer when the tags stored in the pointer and the registers do not agree with each other, the tag added to the audio pack or the sub-picture pack has been rewritten into a predetermined value, and also, a capacity of each of some of the buffers determined according to the types of the video pack, the audio pack and the sub-picture pack, for each of which the tag has not been rewritten into the predetermined value, is free.

10. The data decoding device as claimed in claim 5, wherein:
said navy pack includes reproduction control information for the video pack, audio pack and sub-picture pack.

11. A data decoding method for decoding compressed and coded data, the data decoding method comprising:
a) separating compressed and coded data into a plurality of unit data;
b) further separating the unit data into more than one types of data packs;
c) for each unit data, adding tags to the data packs such that the added tags identify the data packs as originating from the same unit data; and
d) monitoring the tags, while carrying out decoding of the data packs originating from the same unit data, for each unit data;
wherein the data decoding method is to be carried out in a physical, data decoding device.

12. A semiconductor integrated circuit configured to decode compressed and coded data, comprising:
an inverse multiplexing part configured to separate compressed and coded data into a plurality of units of unit data, then separate the unit data into more than one types of data packs, and, for each unit data, add tags to the data packs such that the added tags identify the data packs as originating from the same unit data; and
a decoding part configured to monitor the tags, while carrying out decoding of the data packs originating from the same unit data, for each unit data.

13. A data decoding system for decoding compressed and coded data, comprising:
an inverse multiplexing part configured to separate compressed and coded data into a plurality of units of unit data, then separate the unit data into more than one types of data packs, and, for each unit data, add tags to the data packs such that the added tags identify the data packs as originating from the same unit data; and
a decoding part configured to monitor the tags, while carrying out decoding of the data packs originating from the same unit data, for each unit data.

14. The data decoding method according to claim 11, wherein the coded data represents at least one of video and audio data.

* * * * *